United States Patent
Schonfelder

(10) Patent No.: US 6,990,882 B2
(45) Date of Patent: Jan. 31, 2006

(54) DEVICE FOR PRECISION CUTS ON ALUMINUM AND VINYL SIDING AND OTHER CONSTRUCTION MATERIALS

(75) Inventor: William Schonfelder, Wittenberg, WI (US)

(73) Assignee: Tapco International Corporation, Wixom, MI (US)

(*) Notice: Subject to any disclaimer, the term of this patent is extended or adjusted under 35 U.S.C. 154(b) by 0 days.

(21) Appl. No.: 10/339,110

(22) Filed: Jan. 9, 2003

(65) Prior Publication Data
US 2003/0136241 A1    Jul. 24, 2003

Related U.S. Application Data

(60) Provisional application No. 60/348,173, filed on Jan. 9, 2002.

(51) Int. Cl.
*B27B 9/00*    (2006.01)

(52) U.S. Cl. .................. 83/467.1; 83/468.1; 83/471.2; 83/485; 83/574

(58) Field of Classification Search .............. 83/468, 83/581, 574, 486.1, 467.1, 471.2, 523, 821, 83/485, 468.1, 477.2
See application file for complete search history.

(56) References Cited

U.S. PATENT DOCUMENTS

| | | | | |
|---|---|---|---|---|
| 2,968,325 A | * | 1/1961 | Wandvik | 83/435.14 |
| 4,007,657 A | * | 2/1977 | Burch | 83/471.3 |
| 4,320,678 A | * | 3/1982 | Volk | 83/581 |
| 4,489,634 A | * | 12/1984 | Volk | 83/574 |
| 5,090,283 A | * | 2/1992 | Noble | 83/468.1 |
| 5,269,356 A | | 12/1993 | Bartz | 144/345 |
| 5,442,984 A | | 8/1995 | Tate | 83/471.2 |
| 5,682,934 A | * | 11/1997 | Rybski | 144/144.51 |
| 5,819,626 A | | 10/1998 | Lucas | 83/489 |
| 6,041,837 A | | 3/2000 | Hanson | 144/371 |
| 6,116,304 A | * | 9/2000 | Wilson et al. | 83/574 |
| 6,488,256 B1 | * | 12/2002 | Chang | 248/670 |
| 6,672,190 B2 | * | 1/2004 | Taylor | 83/581 |
| 2001/0011564 A1 | | 8/2001 | Darling | 144/144.1 |

\* cited by examiner

*Primary Examiner*—Stephen Choi
(74) *Attorney, Agent, or Firm*—Howard & Howard

(57) ABSTRACT

A saw table and a pivot foot for use with a saw table. The saw table includes a pair of first sides, a pair of transverse sides, and a saw cradle. The saw cradle is slidably mounted to the saw table and is slidable between first and second positions. The pivot foot has a first end and a second end. The first end has a coupling feature. The pivot foot also includes a workpiece abutment edge. The workpiece abutment edge is adapted to accept an edge of a workpiece. A coupler connects to the coupling feature and is adapted to rotatably couple the pivot foot to the saw table.

10 Claims, 2 Drawing Sheets

US 6,990,882 B2

DEVICE FOR PRECISION CUTS ON ALUMINUM AND VINYL SIDING AND OTHER CONSTRUCTION MATERIALS

This application claims priority to U.S. Provisional Patent Application Ser. No. 60/348,173, filed Jan. 9, 2002.

TECHNICAL FIELD

The present invention relates generally to a jig for use with a saw table, and more particularly to a jig and a saw table incorporating a jig for performing precision cuts.

BACKGROUND OF THE INVENTION

Very often material or work pieces need to be cut. For example, in the construction and remodeling industries, various construction materials such as, vinyl and aluminum siding, tile, steel, half wrapped log siding, textured ceiling tile, etc., must be cut and sized to fit the job. Typically, angled cuts are required. Cutting such materials for these applications by hand leads to inaccurate and unusable parts which then must be scrapped.

Saw tables exist which allow a workpiece to be cut at an angle. Typically, the workpiece may be clamped to the table. The saw or tool which is to perform the operation on the workpiece is then set to the desired angle to perform the operation. Thus, the saw table must be built to adjust the angle of the saw, lock it in place, and allow it to move to perform the cut. This increase the complexity and cost of the saw table.

Other saw tables allow the position of the workpiece to be adjusted. The saw or tool is stationery. Two such devices are shown in U.S. Pat. No. 5,269,356 issued to William R. Bartz on Dec. 14, 1993 and U.S. Pat. No. 6,041,837 issued to Thomas William Hanson on Mar. 28, 2000. However, in both devices, the workpiece and the jig holding the workpiece must be moved toward and away from the rotating saw. This also increase the complexity and thus the cost of the saw table. Furthermore, the workpiece either floats against the jig or otherwise must be clamped to the jig. The first may lead to inaccurate cuts and the latter will again increase the complexity and cost of the saw table.

The present invention is aimed at one or more of the problems set forth above.

SUMMARY OF THE INVENTION AND ADVANTAGES

In one aspect of the present invention, a device for use with a saw table is provided. The saw table includes a pair of first sides, a pair of transverse sides, and a saw cradle. The saw cradle is slidably mounted to the saw table and is slidable between first and second positions. The device includes a pivot foot having a first end and a second end. The first end has a coupling feature. The pivot foot also includes a workpiece abutment edge. The workpiece abutment edge is adapted to accept an edge of a workpiece. A coupler connects to the coupling feature and is adapted to rotatably couple the pivot foot to the saw table.

In another aspect of the present invention a saw table having a table base and a pivot foot is provided. The table base includes a pair of first sides and a pair of transverse sides. A saw cradle is slidably mounted to the table base and is slidable between first and second positions. The saw cradle is adapted to removably accept a saw. The pivot foot includes a first end and a second end and is rotatably coupled to the table base. The pivot foot also includes a workpiece abutment edge for accepting an edge of a workpiece.

In still another aspect of the present invention, a saw table having a table base and a pivot foot is provided. The table base has a pair of first sides and a pair of transverse sides. The saw cradle is slidably mounted to the table base and is slidable between first and second positions. The saw cradle is adapted to removably accept a saw. The pivot foot has a first end and a second end and is rotatably coupled to the table base. The first end has a coupling feature. The pivot foot also includes a workpiece abutment edge for accepting an edge of a workpiece. The saw table further includes a releasable pin for insertion into the aperture and rotatably coupling the pivot foot to the table base.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF INVENTION

Figure 2:
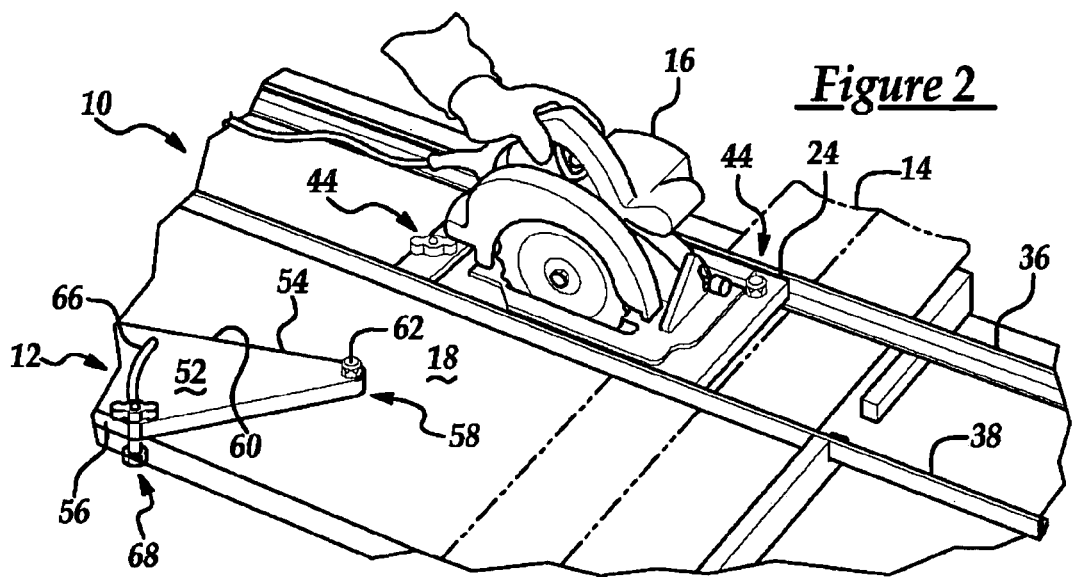
FIG. 2 is a three dimensional drawing of a portion of the saw table of FIG. 1 in use with a saw for cutting a workpiece at a right angle.
Figure 3:
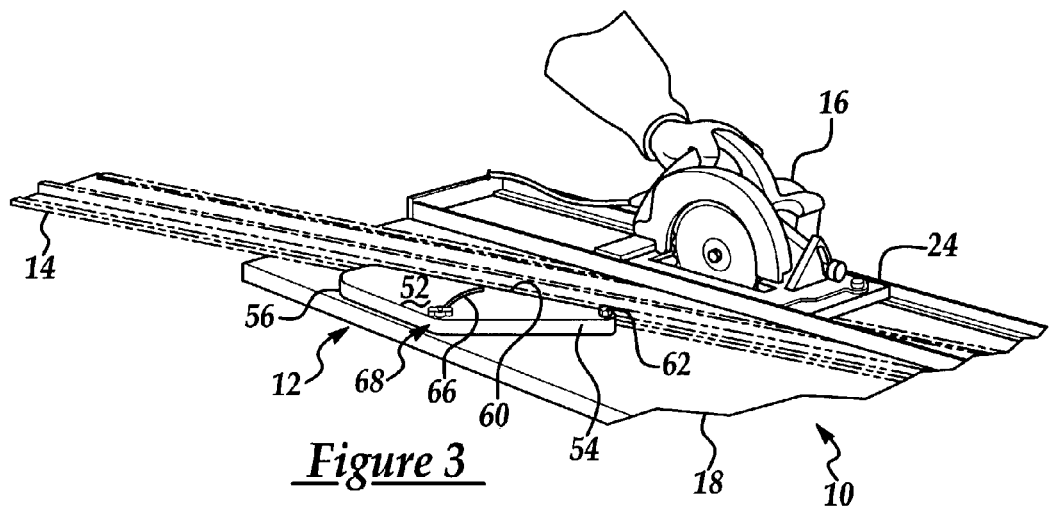
FIG. 3 is a three dimensional drawing of a portion of the saw table of FIG. 1 in use with a saw for cutting the workpiece at an angle determined by the pivot foot; and, FIG. 4 is an enlarged three dimensional drawing of the portion of the saw table of FIG. 3.
Figure 4:
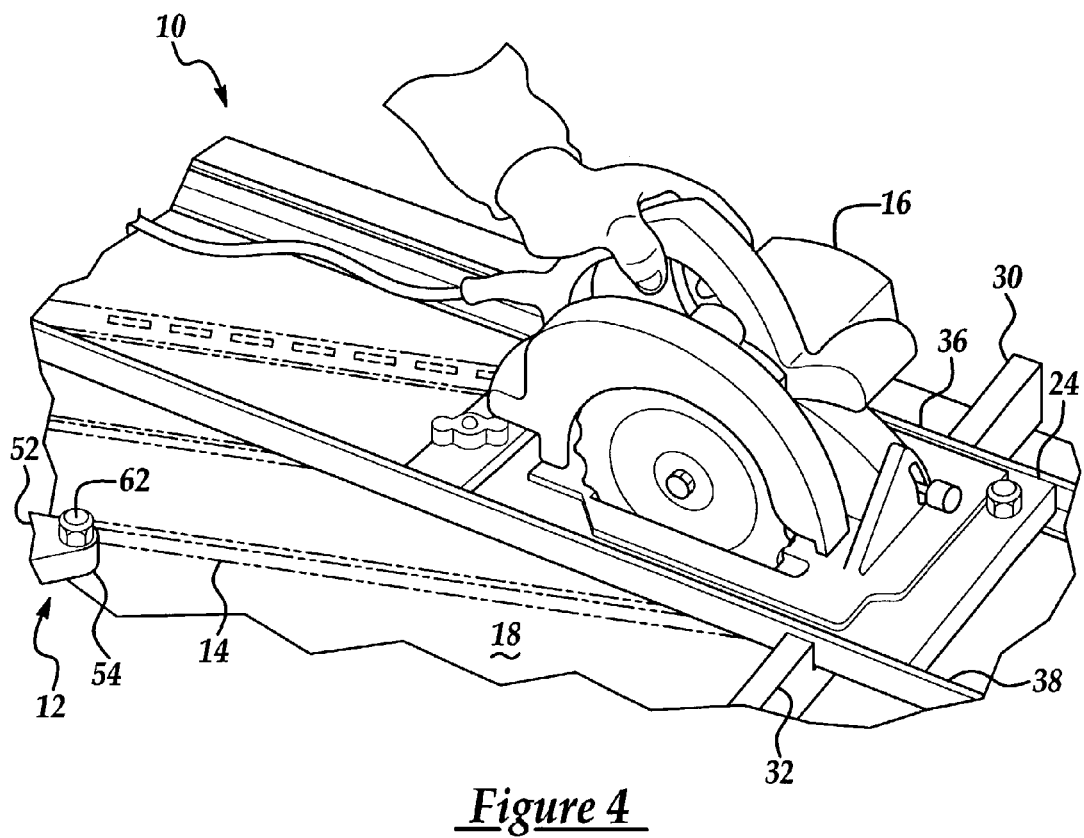

With reference to the drawings and in operation, the present invention provides a saw table 10 and a device 12 for use with the saw table that facilitates precision cuts to be performed on a workpiece 14 (shown in phantom lines in FIGS. 2–4). For example, the saw table 10 may be used to cut construction materials, such as vinyl and aluminum siding, tile, steel, half wrapped log siding, textured ceiling tile, etc . . . As shown in FIGS. 2–3, a saw or circular saw 16 may be used to perform the cutting operation. It should be noted that other types of saws may be used to work on different types of materials. Additionally, the saw 16 may be outfitted with different types of blades to cut different types of materials, e.g., a masonry blade.

In one aspect of the present invention, the saw table 10 is lightweight and portable, i.e., it may be moved from jobsite to jobsite with relative ease. The saw table 10 may be supported by (and/or affixed to by clamping, nailing, screwing or other suitable means) a pair of sawhorses (not shown) or other work table or may be placed on the ground. Breakdown is, thus, fast and very time efficient.

As discussed below, in another aspect of the present invention, the saw 16 is allowed to travel in first and second directions along the saw table 10. In one embodiment of the present invention, the first and second directions are fixed with respect to the saw table 10. The device 12 allows the workpiece to be set in position such that the desired cut may be performed. During the cutting operation, the workpiece 14 does not move relative to the saw table 10. Only the saw 16 moves during the cutting process. This makes the cutting process more accurate and safer.

Figure 1:
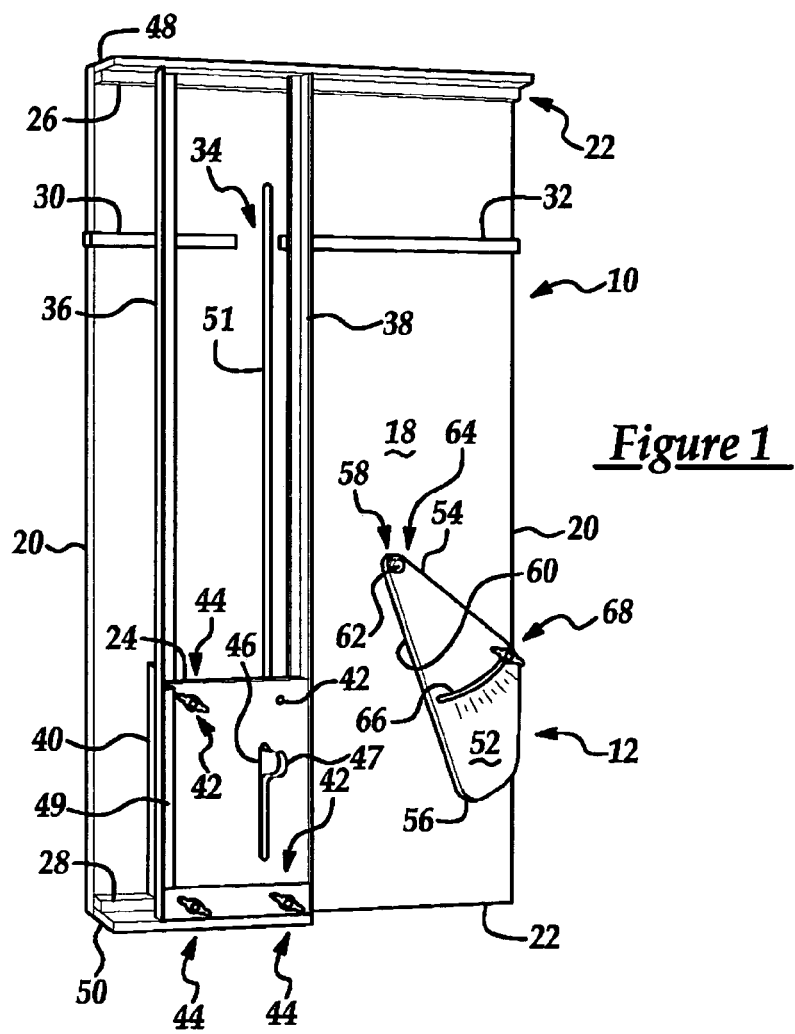
FIG. 1 is a three dimensional drawing of a saw table having a pivot foot, according to an embodiment of the present invention.

With specific reference to FIG. 1, the saw table 10 has table base 18 with a pair of first sides 20 and a pair of transverse sides 22. A saw cradle 24 is slidably mounted to the saw table 10 (see below) and is slidable between first and second positions. In one embodiment, the table base 18 may be constructed of waterproof treated oak plywood. However, those skilled in the art will recognize that the table base 18 may be made from a variety of suitable materials.

In the illustrated embodiment, the saw table 10 includes a first track support 26 and a second track support 28. The first track support 26 is positioned adjacent one of the transverse sides 22. The second track support 28 is positioned adjacent the other of the transverse sides 22. A first mid-track support 30 and a second mid-track support 32 are positioned parallel and between the first and second track supports 26, 28. The first and second mid-track supports 30,32 are spaced apart forming a gap 34.

In the illustrated embodiment, the first and second track supports 26, 28 and the first and second mid-track supports 30, 32 are composed from wood and may be fastened to the table base 18 by any suitable means, such as, screws, nails, adhesive, etc. . . .

First and second tracks 36, 38 are positioned perpendicular to the first and second track supports 26, 28. A first end of the first and second tracks 36, 38 are supported by the first track support 26 and a second end of the first and second tracks 36, 38 are supported by the second track support 28. The first and second tracks 36, 38 are also supported by the first and second mid-track supports 30, 32, respectively. A third track support 40 is positioned adjacent the second track support 28 parallel to and underneath the first track 36. The third track support 40 supports the weight of the saw cradle 24 and the saw 16 without impeding insertion of the workpiece underneath the second track 38. In the illustrated embodiment, the first and second tracks 36, 38 are made of aluminum and have an L-shaped cross section. The first and second tracks, 36, 38 may be fastened to the supports 26, 28, 30, 32, 40 via any suitable fastening method, such as screws or nails.

The saw cradle 24 may also be made from wood and have a plurality of apertures 42 therethrough. The first and second tracks 36, 38 are spaced to receive the saw cradle 24 therebetween. In an alternative embodiment, the distance between the tracks 36, 38 may be adjusted to accommodate different tools or a different sized saw 16. The height of the tracks 36, 38, i.e., the distance between the bottom of the tracks 36, 38 and the top of the table base 18, may also be adjusted to accommodate different sized material.

One or more releasable clamps 44 may be used to keep the saw 16 attached to the saw cradle 24. In one embodiment, the releasable clamps 42 include a bolt threaded through one of the apertures 42. The saw cradle 24 may be provided with a plurality of apertures 42 to allow the saw cradle 24 to be used with a variety of saws or tools 16. A spring and a nut (or wing-nut) may be threaded onto the end of the bolt underneath the respective track 36, 38. The saw cradle 24 is held in position by the weight of the saw 16 and the saw cradle 24. During the cutting operation, the saw 16 and the saw cradle slide along the first and second tracks 36, 38.

The saw cradle 24 also includes a slot 46 for passage of the blade of the saw 16. In use, the saw 16 is positioned on the saw cradle 24 such that the blade of the saw 16 passes through the slot 46. In one embodiment, the saw 16 rests on the saw cradle 24 and is maintained in position by its weight. In another embodiment, the saw 16 may be clamped or otherwise removable fastened to the saw cradle 24. A pre-cut groove 51 may be pre-formed in the table base 18 to prevent the saw blade from cutting through and damaging the work surface of the table base 18. A view window 47, also cutout from the saw cradle 24 may be provided to allow a user to view the cut during the cutting operation.

A guide 49 may also be attached to the top of the saw cradle 24. The guide 49 helps to keep the saw 16 parallel to the tracks 36, 38.

First and second strips 48, 50 may be fastened to the first and second track supports, respectively, to act as a hold down for the first and second tracks 36, 38, respectively. The first and second strips 48, 50 may be made of wood or other suitable material.

Aluminum strips (not shown) may be wrapped around the sides of the table base 18 to maintain the edges thereof.

In the illustrated embodiment, the device 12 includes a pivot foot 52 which in the illustrated embodiment is made of wood. The pivot foot 52 has a first end 54 and a second end 56. The first end 54 has a coupling feature 58. The pivot foot also includes a workpiece abutment edge 60. The workpiece abutment edge 60 is adapted to accept an edge of the workpiece 14. In other word, after the pivot foot 52 is positioned, an edge of the workpiece 14 may be placed adjacent the workpiece abutment edge 60. A coupler 62 connects to the coupling feature 58 and is adapted to rotatably couple the pivot foot 52 to the saw table 10. In the illustrated embodiment, the coupling feature 58 is an aperture 64 in the first end 54 of the pivot foot 52. The coupler 62 may be a pin or a bolt. The pin may be held in place by a removable clip in a manner well-known in the art. The bolt may be held in place by a spring and nut or wing-nut (not shown).

In another aspect of the present invention, the pivot foot 52 includes a plurality of predefined settings, each predefined setting corresponding to a cut angle. In one embodiment, the predefined settings includes a plurality of markings on a front surface of the pivot foot 52 or the table base 18. In order to set the desired angle, the corresponding marking is matched with a reference mark (located on the other of the front surface of the pivot foot 52 or the table base 18). In one embodiment, the pivot foot 52 includes slot 66 through which the markings on the table base 18 are visible. The pivot foot 52 may also include a releasable locking mechanism which allows the pivot foot 52 to be positioned in each predetermined angle positions. Alternatively, a bolt-nut arrangement 68 may be used to lock the pivot foot 52 in place. In a further embodiment, the pivot foot 52 may be locked in place using a clamp (not shown).

In use, the workpiece 14 may be cut to a desired length with a 90 degree angle cut (as shown in FIG. 2). The workpiece 14 is positioned underneath the tracks 36, 38 and placed adjacent the first and second mid-track supports 30, 32. As shown, the workpiece 14 is thus perpendicular to the tracks 36, 38. The workpiece 14 may be clamped to the table base 18. The workpiece 14 may then be cut to length by operation of the saw 16 and movement of the saw 16 along the track 36, 38.

If, the workpiece 14 is to have an angled cut at one or both of its ends, the workpiece 14 is removed from the saw table 10 and the pivot foot 52 is set to the correct position to achieve the desired angle, as discussed above. Then, as shown in FIGS. 3 and 4, an edge of the workpiece 14 is set against the workpiece abutment edge 60 of the pivot foot. In one embodiment, a corner of the workpiece 14 is set within the gap 34 such that one side of the corner is adjacent the first mid-track support 30 and another side of the corner is adjacent the second mid-track support 32. This further helps to position and maintain the correct position of the workpiece 14 during the cutting operation. The workpiece 14 may be further clamped to the saw table 10. The workpiece 14 may then be cut to have the correct angle as determined by the position of the pivot foot 52. If, the other end of the workpiece 14 is to be cut having a similar angle, the pivot foot 52 does not have to be repositioned. The workpiece simply needs to have removed and the opposite end positioned under the tracks 36, 38.

The present invention has been described in relation to the illustrated embodiment. However, it should be recognized that modifications may be made to the disclosed embodiment without departing from the spirit of the invention. Other aspects and features of the present invention can be obtained from a study of the drawings, the disclosure, and the appended claims.

What is claimed is:

1. A saw table, comprising:
   a table base having a pair of first sides, a pair of transverse sides;
   a pair of first track supports mounted to the table base, one of the first track supports being mounted at one of the transverse sides, another of the first track supports being mounted at another of the transverse sides;
   a first track mounted to the table base, and being supported by the pair of first track supports;
   a second track mounted to the table base in a position parallel to the first track, defining a distance between the first and second tracks,
   a first mid-track support mounted to the table base, the first mid-track support supporting the first track between the pair of first track supports;
   a second mid-track support mounted to the table base, the second mid-track support supporting the second track between the pair of first track supports, the first and second mid-tracks extending from opposite of the first sides of the table base and forming a gap, each of the first and second mid-track supports having a cutout, and the first and second tracks each being engaged in a respective one of the cutouts the second track being unsupported between the second track support and the second mid-track support;
   a third track support being positioned underneath the first track for supporting the first track;
   a saw cradle slidably engaged with the first and second tracks, the saw cradle being slidable between first and second positions, the saw cradle being adapted to removably accept a work tool;
   a precut groove located between the first and second tracks on the table base for allowing a blade of the work tool to cut a work piece without damaging the table base, the precut groove extending past the first and second mid-tracks; and,
   a pivot foot having a first end and a second end and being rotatably coupled to the table base, the pivot foot also including a workpiece abutment edge for accepting an edge of a workpiece, the first end having a coupling feature and further comprising a pin for connecting to the coupling feature and being adapted to rotatably couple the pivot foot to the saw table, the pin being releasable.

2. A saw table, as set forth in claim 1, wherein the pin is a bolt.

3. A saw table, as set forth in claim 2, further including a nut for engaging a threaded end of the bolt.

4. A saw table, as set forth in claim 1, wherein the pivot foot includes a plurality of predefined settings, each predefined setting corresponding to a cut angle.

5. A saw table, as set forth in claim 4, wherein the predefined settings include a plurality of angle markings on a front surface of the pivot foot.

6. A saw table, as set forth in claim 1, the saw cradle having an aperture to allow the saw cradle to be used with a variety of work tools.

7. A saw table, as set forth in claim 6, wherein the aperture in the saw cradle is a slot to allow for the passage of a blade of a saw.

8. A saw table, as set forth in claim 1, further comprising clamping members for clamping the work tool to the saw cradle.

9. A saw table, as set forth in claim 1, the saw cradle including a view window to allow a user to view operation of the work tool.

10. A saw table, as set forth in claim 1, the saw cradle including a guide for assisting keeping the work tool aligned with the first and second tracks.

* * * * *